Aug. 11, 1925.                                                              1,549,513
H. G. SLINGLUFF
APPARATUS FOR MAKING SHEET GLASS
Filed June 5, 1924                2 Sheets-Sheet 2
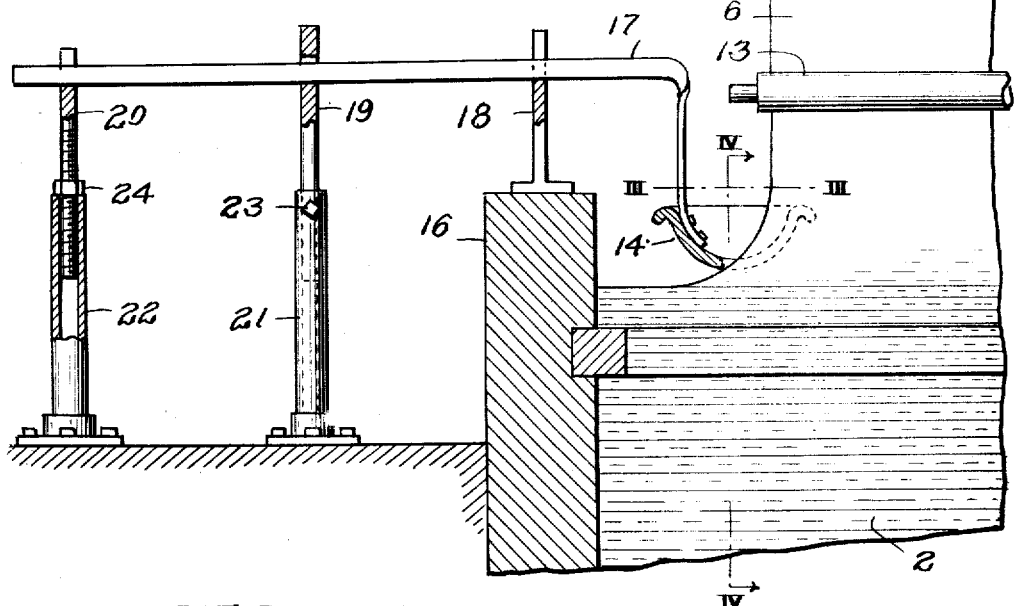
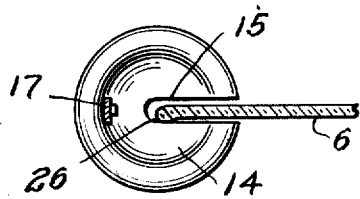
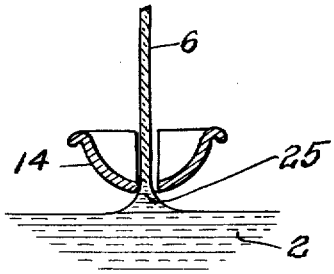
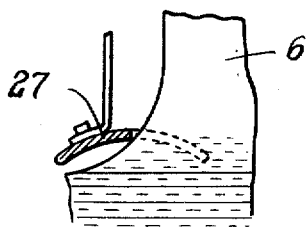
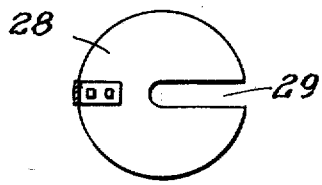
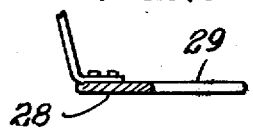
INVENTOR
H. G. Slingluff.
by
James C. Bradley
Atty.

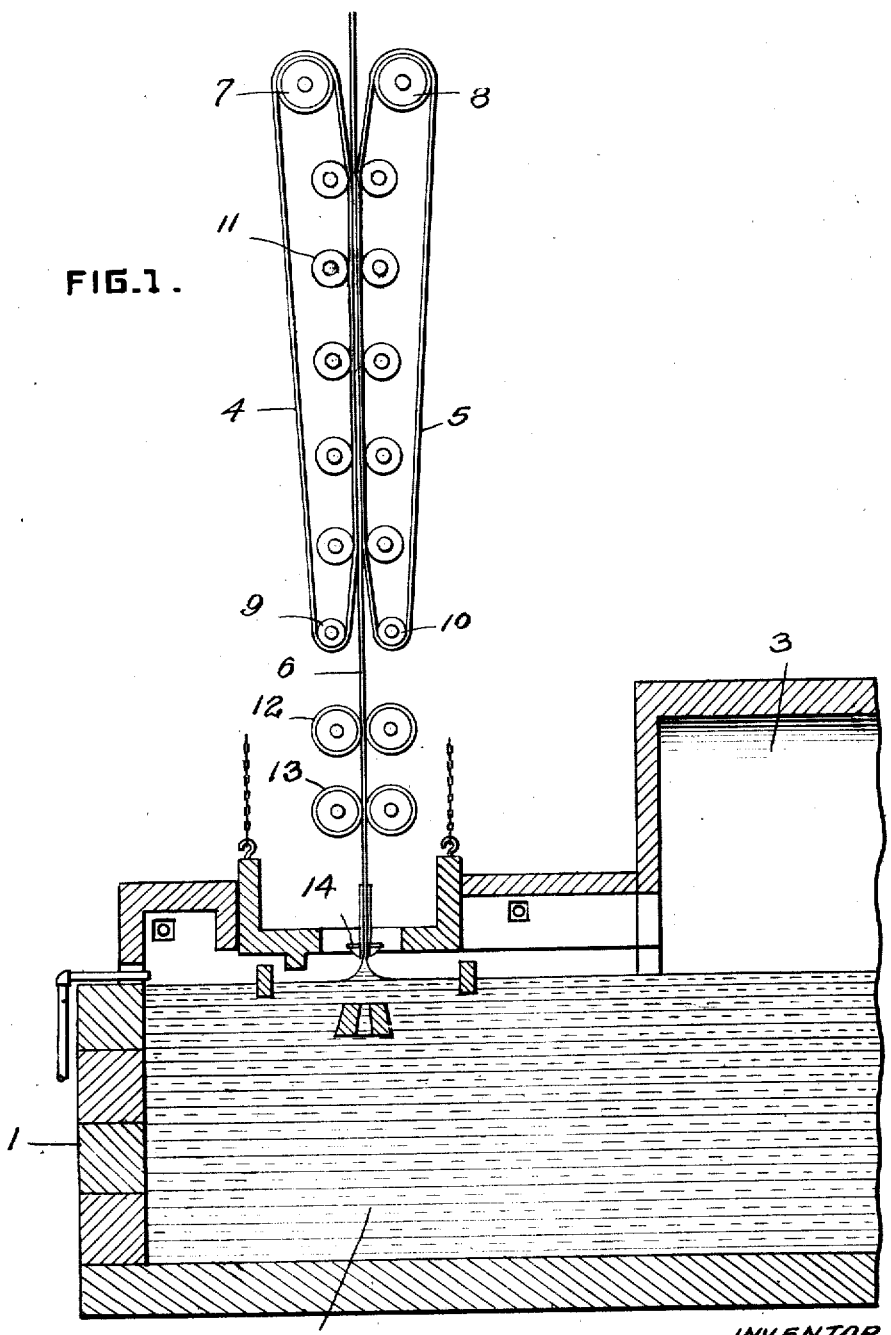

Patented Aug. 11, 1925.

1,549,513

UNITED STATES PATENT OFFICE.

HARRY G. SLINGLUFF, OF MOUNT VERNON, OHIO, ASSIGNOR TO PITTSBURGH PLATE GLASS COMPANY, A CORPORATION OF PENNSYLVANIA.

APPARATUS FOR MAKING SHEET GLASS.

Application filed June 5, 1924. Serial No. 718,029.

*To all whom it may concern:*

Be it known that I, HARRY G. SLINGLUFF, a citizen of the United States, and a resident of Mount Vernon, in the county of Knox and State of Ohio, have made a new and useful invention in Improvements in Apparatus for Making Sheet Glass, of which the following is a specification.

The invention relates to a process and apparatus for making sheet glass and particularly to the means applicable where the continuous sheet is drawn from an open pool or bath, for maintaining the width of the sheet during a protracted drawing period. It has for its principal objects; (1) the provision of improved means, and procedure, applicable in the relation stated, and requiring only a very simple construction, for automatically maintaining the position of the edges of the sheet at substantially fixed points so that a continuous sheet is secured of uniform width and having straight smooth edges, and (2) the provision of edge maintaining means and procedure which accomplish the holding function without rendering the edges hard and brittle or rough, so that breakage due to these causes and to insufficient annealing are avoided. Certain means for carrying out the invention are illustrated in the accompanying drawings wherein:

Figure 1 is a diagrammatic side elevation showing the drawing apparatus with which the edge holding device is preferably used, such drawing apparatus being shown in my pending application, Serial Number 621,184. Fig. 2 is a transverse section through one side of a drawing tank showing the edge holding device in side elevation. Figs. 3 and 4 are sectional views on the lines III—III and IV—IV respectively of Fig. 2. Figs. 5 and 6 are sectional and plan views illustrating a modification. And Fig. 7 is a sectional view illustrating still another modification.

Referring to the drawings, 1 is the drawing tank or extension carrying a molten bath or pool of glass 2 in communication with a suitable melting tank, the end 3 only of which is shown and 4 and 5 are endless belts, preferably of asbestos fabric for continuously drawing the sheet of glass 6 from the molten bath. 7 and 8 are the driving pulleys for the belts, such belts being driven from a suitable motor, not shown; 9 and 10 are solid steel bars circular in cross section lying in the lower ends of the belts and serving by reason of their weights to hold the belts in tension; 11 are a series of rolls back of the inner flights of the belts for pressing the belts against the glass, such rolls being yieldingly held inward by means of springs or weights, not shown; 12 and 13 are pairs of driven rolls covered with asbestos for assisting in the drawing of the sheet; and 14 is one of the edge holding devices, it being understood that such edge holding devices may be used in connection with any form of drawing mechanism, and that one of these devices is used on each side of the sheet.

The member 14, in its preferred form, consists of a dished plate or bowl provided with the slot 15 which extends from one edge of the member inward to about the center thereof. This member is preferably a casting of steel or iron or of some heat resisting metal. It may vary considerably in diameter and other proportions, but has been found to work very satisfactorily when made about 9 or 10 inches in diameter with the slot 15 approximately 1 inch wide. It is desirable that it may be adjustably supported so that its height may be varied and also its distance from the furnace wall 16. This may be accomplished in a great variety of ways, the method shown being relatively simple and serving to give the necessary adjustments. As illustrated, a bar 17 is employed bolted to the inner face of the member 14 and supported upon the three members 18, 19 and 20, the members 18 and 20 being forked at their upper ends to receive the bar, while the member 19 is slotted with the bar extending through the slot. The members 19 and 20 are adjustable as to height in the standards 21 and 22, the set screw 23 serving to hold the member 19, while the nut 24 holds the member 20. This arrangement permits of a vertical adjustment of the position of the member 14 and its adjustment toward and from the center line of the sheet.

In using the apparatus, the sheet drawing is started by the use of a bait which is dipped into the glass and drawn up through the mechanism illustrated in Fig. 1, the devices 14 being at such time out of position so that this starting operation is not interfered with. As soon as the sheet is started, the members 14, which have been heated until they show color, are put in the position illustrated with the lower convex surface of the members at about 1½ inches above the level of the glass and just contacting with the tapering base 25 of the sheet 6 as indicated in Fig. 4. This contact serves to hold the edge of the sheet and prevent its gradually working inward, as would be the case if no holding means were employed. The holding effect is apparently due to adhesion, as the drawn sheet at its edge shows a slight lining indicating that there has been some adherence to the metal of the members 14, and these members when removed from service show a slight amount of glazing at the points of contact with the molten glass. The extreme outer portion 26 (Fig. 3) of the bead or enlargement which is formed is ordinarily perfectly smooth, indicating that this portion of the sheet does not contact with the metal of the member 14, and the lining of the edge occurs inward from this portion 26 and more on one side of the sheet than the other. This is probably due to the width of the slot as compared with the thickness of the sheet, and the fact that the sheet does not remain perfectly central with respect to the slot, but tends to work over to one side or other of the slot as indicated in Fig. 3. The edge which is produced, therefore, is in most cases perfectly smooth at its extreme outer portion, and on one side of the edge inward from this outer portion, the surface is practically free from lines, while on the other side of the edge it is slightly lined.

While in service the members 14 receive sufficient heat from the glass to keep them at a temperature such that they show color, and the edges of the glass sheet, when once fixed, continue in these positions, so that the sheet is always of the same width, and these edges are comparatively soft and well annealed. It is believed that the improved condition of the edges as compared with edges formed by stripping fingers or hand operated stroking tools is due to the temperature conditions established by the use of the members 14 and incident to their heat retaining capacity and to their shielding effect. It is also believed that the temperature conditions of the glass, both in the bath below the members 14, and in the edges of the sheet thereabove, are maintained relatively high and more uniform than is the case where these devices are not employed, and this gives an edge which is softer and better annealed than if these conditions of temperature were not maintained. The members 14 apparently act as shields for the glass bath thereneath and reflect the heat from the bath downward, while their shape is such that they enclose portions of the edges of the sheet, shielding them and tending to temper them by reason of the radiated heat from the relatively heavy metal. For these reasons, it is desirable to make the members 14 of relatively large diameter and substantial thickness so that they will hold a large amount of heat and thus prevent fluctuations of temperature tending to produce unevenness in the quality of the glass constituting the edges. A uniform well annealed edge is highly desirable, since otherwise a great deal of breakage is caused in the drawing operation incident to the strain set up in the edges tending to warp the sheet. This of itself not only tends to fracture the sheet, but also leads to breakage, due to the crushing pressure exerted by the drawing devices upon the sheet tending to break it when it is not perfectly flat. It has been found that the quality of the edge is best when the slot 15 is relatively wide, several times the thickness of the sheet to be produced, and when this slot does not extend further into the members 14 than illustrated, namely, amout the center.

I am further of the opinion that the placing of the members 14 above the surface of the bath rather than in contact with it serves to secure a somewhat higher temperature at these portions of the bath and a more uniform temperature, since the members, particularly if formed of metal, (which is the preferred material) will conduct the heat very rapidly from the bath if in contact with it over a substantial area. The heat absorbed by the members under these conditions is transmitted to the atmosphere, thus reducing the temperature of the glass beneath the bath and causing such temperature to fluctuate (under varying atmospheric temperature conditions) to a greater degree than is the case with the members spaced above the bath. For this reason, it is preferred to space the members 14, above the surface of the bath, and for the further reason, that under these conditions the members are not subject to the corrosive action of the glass, which would require the making of the members of special heat resisting composition, if they were kept in contact with the molten bath. However, I have found that the members 14 will operate successfully, even if lowered, so that their bottoms contact with the surface of the bath, so that in its broader aspect, the invention is not limited to the use of the members out of contact with the surface of the bath. When lowered so as to contact with the surface of the bath, the major portions of the members still lie above the level of the bath and the edges of the sheet are drawn through the slots 15 in the members just as in the preferred operation. Under these conditions, however, the edge of the sheet works out toward the end of the slot 15 in the member a distance depending on the amount the dish shaped member is pressed into the bath. As in the preferred operation, a point of equilibrium is immediately established with the glass edge at a definite point in the slot 15, which remains fixed throughout the drawing operation.

Figs. 5 and 6 illustrate a modification in which the member 27 for holding the edge of the sheet is inverted. This device is not as satisfactory as the one illustrated in Figs. 1 to 4, but it will maintain the edge of the sheet and give an annealing effect somewhat similar to that of the other form of device, the mass of metal serving to hold the heat in the vicinity of the edge and to shield such edge and the bath beneath.

Similarly as to the construction of Fig. 7 in which a flat plate 28 is employed having a slot 29 through which the edge of the sheet is drawn. If made of sufficient mass and area, and if properly adjusted, this form of device will perform to a large degree the function of the construction of Figs. 1 to 4, although not with the same degree of effectiveness.

What I claim is:

1. In combination with apparatus arranged so as to draw a glass sheet from an open pool of molten glass, of means for preventing inward movement of the edge of the sheet in said open pool, comprising a shielding member spaced above the surface of the pool but closely adjacent thereto and provided with a slot on its inner side into which the edge of the sheet extends, such member being of sufficient area and mass to materially retire the radiation of the heat from the area of the pool beneath it from which the edge of the sheet is drawn, and sufficient to materially retard the cooling of the edge of the sheet above said member.

2. In combination with apparatus arranged so as to draw a glass sheet from an open pool of molten glass, of means for preventing inward movement of the edge of the sheet in said open pool, comprising a shielding plate spaced above the surface of the molten pool, but closely adjacent thereto and having a slot extending inwardly from its edge and fitting around the edge of the sheet, the said plate being dished with its convex side down.

3. In combination with apparatus arranged so as to draw a glass sheet from an open pool of molten glass, of means for preventing inward movement of the edge of the sheet in said pool, comprising a shielding plate spaced above the surface of the molten pool, but closely adjacent thereto and having a slot extending inwardly from its edge and fitting around the edge of the sheet, the said plate being of such area and thickness, so as to perform the functions of shielding a substantial area of said open pool surrounding the edge of the sheet at its base and of retarding the radiation of heat from such area, so that such area of the pool is hotter than the glass surrounding it.

4. In combination with apparatus arranged so as to draw a glass sheet from an open pool of molten glass, of means for preventing inward movement of the edge of the sheet in said open pool, comprising a shielding member spaced above the surface of the pool but closely adjacent thereto and provided with a slot on its inner side into which the edge of the sheet extends, but of substantially greater width than the thickness of the glass edge which is to be formed therein, the said member having a mass and heat radiating capacity such that the cooling of the edge of the sheet lying adjacent the member is materially retarded.

5. In combination with apparatus arranged so as to draw a glass sheet from an open pool of molten glass, of means for preventing inward movement of the edge of the sheet in said open pool, comprising a shielding member spaced above the surface of the pool and provided with a slot extending inwardly from its edge and surrounding the edge of the base of the sheet, the member being at a level adjacent the surface of the pool such that the metal surrounding the slot engages the tapering base of such sheet, the said member having a mass and heat radiating capacity such that the cooling of the edge of the sheet lying adjacent the member is materially retarded.

6. In combination with apparatus arranged to draw a glass sheet from an open pool of molten glass, of a hot member spaced above the surface of the pool but closely adjacent thereto and positioned to have the edge portion of the sheet contact therewith and by adhesion prevent inward movement of the edge of the sheet in said open pool, said member being of sufficient area to shield and prevent radiation of heat from the molten glass in the pool underneath it, so that the temperature thereof is greater than that of the surrounding glass.

7. In combination with apparatus arranged to draw a glass sheet from an open pool of molten glass, of a hot member spaced above the surface of the pool but closely adjacent thereto and positioned to have the edge portion of the sheet contact therewith and by adhesion prevent inward movement of the edge of the sheet in said pool, said member being of such mass that the heat absorbed by it from the pool and radiated to the edge portion of the sheet will cause such edge portion to anneal.

8. In combination with apparatus arranged to draw a glass sheet from an open pool of molten glass, of a hot member above the surface of the pool but closely adjacent thereto and positioned to have the edge portion of the sheet contact therewith and by adhesion prevent inward movement of the edge of the sheet in said open pool, said member being of such form as to shield the edge portion of the glass above it and prevent too rapid cooling and of such lateral area and mass as to materially reduce the cooling by radiation of the portion of the pool from which the edge of the sheet is drawn.

9. In combination with apparatus arranged to draw a glass sheet from an open pool of molten glass, of a hot member spaced above the surface of the pool but closely adjacent thereto and positioned to have the edge portion of the sheet contact therewith and by adhesion prevent inward movement of the edge of the sheet in said open pool, said member being of such area and mass as to thereby shield the glass in the pool underneath it and radiate heat to the edge portion of the glass above it so as to retard the cooling of such edge and promote its annealing.

10. In combination with apparatus arranged to draw a glass sheet from an open pool of molten glass, of a dish shaped member having its sides above the surface of the bath and with a slot on its inner side through which the edge of the sheet extends and is drawn.

11. In combination with apparatus arranged to draw a glass sheet from an open pool of molten glass, of a concave convex member of metal composition with its convex side down and having its sides above the surface of the bath with a slot on its inner side through which the edge of the sheet extends and is drawn.

In testimony whereof, I have hereunto subscribed my name this 31st day of May, 1924.

HARRY G. SLINGLUFF.

tion of the sheet contact therewith and by adhesion prevent inward movement of the edge of the sheet in said open pool, said member being of such form as to shield the edge portion of the glass above it and prevent too rapid cooling and of such lateral area and mass as to materially reduce the cooling by radiation of the portion of the pool from which the edge of the sheet is drawn.

9. In combination with apparatus arranged to draw a glass sheet from an open pool of molten glass, of a hot member spaced above the surface of the pool but closely adjacent thereto and positioned to have the edge portion of the sheet contact therewith and by adhesion prevent inward movement of the edge of the sheet in said open pool, said member being of such area and mass as to thereby shield the glass in the pool underneath it and radiate heat to the edge portion of the glass above it so as to retard the cooling of such edge and promote its annealing.

10. In combination with apparatus arranged to draw a glass sheet from an open pool of molten glass, of a dish shaped member having its sides above the surface of the bath and with a slot on its inner side through which the edge of the sheet extends and is drawn.

11. In combination with apparatus arranged to draw a glass sheet from an open pool of molten glass, of a concave convex member of metal composition with its convex side down and having its sides above the surface of the bath with a slot on its inner side through which the edge of the sheet extends and is drawn.

In testimony whereof, I have hereunto subscribed my name this 31st day of May, 1924.

HARRY G. SLINGLUFF.

Certificate of Correction.

It is hereby certified that in Letters Patent No. 1,549,513, granted August 11, 1925, upon the application of Harry G. Slingluff, of Mount Vernon, Ohio, for an improvement in "Apparatus for Making Sheet Glass," an error appears in the printed specification requiring correction as follows: Page 3, line 37, claim 1, for the word " retire " read *retard;* and that the said Letters Patent should be read with this correction therein that the same may conform to the record of the case in the Patent Office.

Signed and sealed this 13th day of October, A. D. 1925.

[SEAL.]

KARL FENNING,
*Acting Commissioner of Patents.*

Certificate of Correction.

It is hereby certified that in Letters Patent No. 1,549,513, granted August 11, 1925, upon the application of Harry G. Slingluff, of Mount Vernon, Ohio, for an improvement in "Apparatus for Making Sheet Glass," an error appears in the printed specification requiring correction as follows: Page 3, line 37, claim 1, for the word " retire " read *retard;* and that the said Letters Patent should be read with this correction therein that the same may conform to the record of the case in the Patent Office.

Signed and sealed this 13th day of October, A. D. 1925.

[SEAL.]
KARL FENNING,
*Acting Commissioner of Patents.*